Patented Nov. 3, 1936

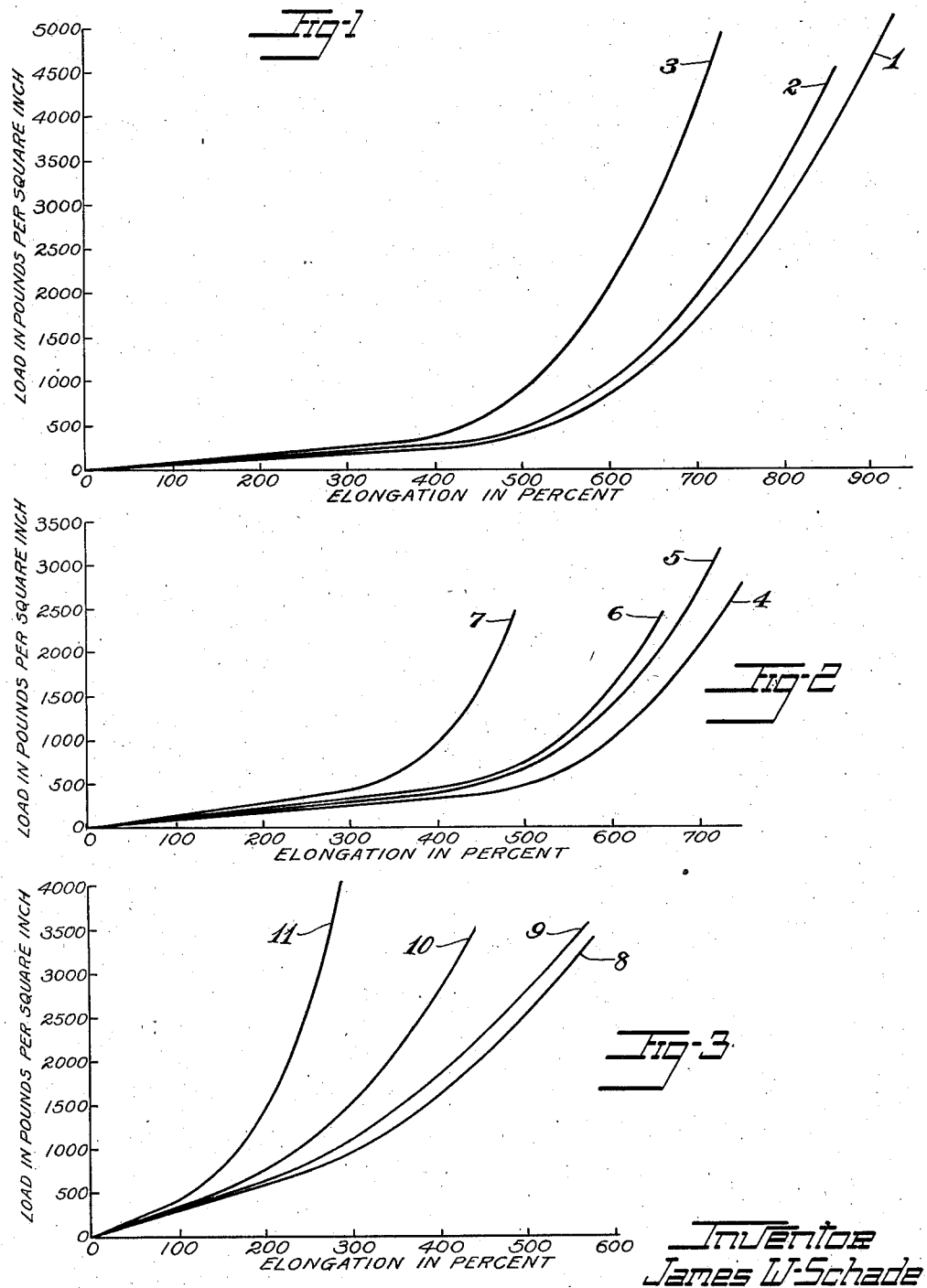

2,059,284

UNITED STATES PATENT OFFICE 2,059,284

RUBBER MANUFACTURE

James W. Schade, Akron, Ohio, assignor to The B. F. Goodrich Company, New York, N. Y., a corporation of New York Application April 4, 1933, Serial No. 664,297

22 Claims. (Cl. 18—53)

This invention relates to a method of manufacturing elastic rubber products exhibiting unusual physical properties such as a stiffer stress-strain relationship, a lower ultimate elongation together with high tensile strength, and superior resistance to certain types of physical wear than is exhibited by prior products of a similar nature.

Heretofore, such basic physical properties of rubber goods have been varied to meet requirements in particular cases by varying the composition of the rubber and by changing the conditions of vulcanization. For example, fillers and pigments of different characteristics have been added to rubber compositions in widely varying proportions; the relative proportions of rubber and vulcanizing agents have been changed; and the time and temperature of vulcanization have been varied over wide ranges.

It has now been discovered that certain fundamental physical properties of rubber may be profoundly changed by treating the rubber in a simple manner to produce a novel product exhibiting valuable and unique properties. This invention in its broadest aspects consists in vulcanizing the rubber while it is under physical stress. In a preferred embodiment the process comprises placing the rubber under tension by stretching it to an appreciable extent and then subjecting the rubber while it is held under tension to vulcanization until it will retain a substantial part of the applied elongation upon releasing the stretching force, without however completely losing its elasticity. This may be accomplished for example by vulcanizing the rubber until an optimum soft rubber cure is produced.

The product resulting from the above treatment is elastic, although its ultimate elongation is found to be reduced by an amount roughly proportional to the elongation applied during vulcanization, and its stress-strain relationship is materially altered, the rubber being considerably "stiffer" (exhibiting a higher modulus at a given elongation) than is a similar composition vulcanized under no stress. The wearing properties of the product are likewise affected as a result of the fundamental changes wrought in the rubber by this treatment.

The invention may be applied either to unmasticated latex rubber or to masticated rubber compositions, although in the latter case it will usually be desirable to vulcanize partially the masticated rubber before stretching it in order to obviate possible undesirable flow or deformation of the usually rather plastic composition during the stretching operation. In some cases, it will be preferable similarly to pre-cure partially latex rubber although this usually will be unnecessary inasmuch as latex rubber before it has been vulcanized and even before it is completely dried possesses sufficient strength and elasticity to permit considerable stretching without producing any undesirable results. The latex rubber should in all cases, however, be dried sufficiently to render it elastic, and generally should be substantially dry.

The extent to which the rubber is stretched while being vulcanized will vary between wide limits according to the properties of the particular composition used, and as may be required to produce the desired properties in the finished product. Usually it will be desirable however to stretch the rubber at least 100%, that is, to twice its normal length, and to vulcanize it while stretched to that extent, although definite changes in the physical properties of the rubber may be detected when it has been vulcanized under lower elongations.

An indication of the manner in which the physical properties of rubber are altered by the treatment of this invention may be had by referring to the following examples and the accompanying drawing in which Fig. 1 is a graph showing the relative stress-strain relationships of several samples of a latex rubber composition which have been vulcanized while stretched to different degrees of elongation.

Fig. 2 is a similar graph showing the stress-strain relationships of several samples of a masticated rubber composition containing a high percentage of rubber, which samples have been vulcanized while stretched to varying degrees.

Fig. 3 is a like graph showing the stress-strain relationships of similarly treated samples of a masticated rubber composition containing a considerable proportion of fillers or pigments.

*Example 1.*—A form coated with a thin film of a latex coagulant was immersed in an ammonia-preserved aqueous dispersion containing 100 parts by weight of rubber added as concentrated latex, 4 parts zinc oxide, 2 parts sulphur, 0.8 part organic accelerator, 0.75 part age-resister, 1.0 part of a wax or resin, and 0.5 part of carbon black. The form was allowed to remain in the aqueous dispersion until a layer of rubber approximately 0.05 inch thick had deposited upon its surface after which the form was withdrawn from the dispersion and the rubber deposit was dried. The dried deposit then was cut into several test strips, each six inches long, which were stretched and mounted upon a suitable holder under different degrees of elongation, namely 0%, 100%, and 400%, and the samples were vulcanized, while so stretched, for 20 minutes at 275° F. in open steam. Upon releasing the stretched samples after vulcanization, they shrunk or recovered respectively only ¾ inch (from 12 inches to 11¼ inches long) and 4 inches (from 30 inches to 26 inches long), indicating that the greater part of the applied elongation was retained after releasing the stretching force.

The stress-strain relationships of the several samples then were determined and have been plotted in Fig. 1 of the drawing, in which the curves numbered 1, 2, and 3 represent respectively the stress-strain relations of the samples stretched during cure 0%, 100%, and 400%. These curves show clearly the marked stiffening and reduction of the ultimate elongation which has been effected. For example, the modulus at 700% elongation of the sample cured under no tension was 1640 pounds per sq. inch, whereas the modulus at the same elongation of the sample which was stretched 400% during cure was 4100 pounds per sq. inch. Likewise, the percentage ultimate elongation of the same sample was reduced by 200%.

The fundamental physical changes effected in the rubber are further evidenced by marked changes in its resistance to certain types of wear. Latex rubber generally has not been entirely satisfactory for use in severe abrasive service but latex products vulcanized under tension according to the present invention exhibit a marked improvement in this respect and are quite satisfactory in their ability to resist abrasion and chafing.

*Example 2.*—A masticated rubber composition containing 87.47 parts by weight of high grade crude rubber, 4.70 parts sulphur, 5.29 parts zinc oxide, 0.66 part diphenyl guanidine, and 1.88 parts stearic acid was prepared in the usual manner by mixing the various ingredients upon a rubber mixing mill. One sheet of the composition was given an optimum cure of 45 minutes at 288° F. Three others sheets of the same composition were given a partial cure of 5 minutes at 288° F., and then were stretched respectively 0%, 100%, and 400%, after which the vulcanization was continued for 40 minutes at 288° F., the samples being held in their stretched condition during the final vulcanization. The stress-strain relationships of the various vulcanized samples were determined and have been plotted in the graph of Fig. 2 in which curve 4 shows the stress-strain relationship of the control sample which was given the optimum uninterrupted cure, and curves 5, 6, and 7 respectively show similar data for the samples which were given a 5 minute partial cure and were stretched 0%, 100% and 400% during the final cure. The modulus of the stock measured at 490% elongation is increased by the stretching to 400% elongation during cure, from 500 pounds/sq. in. to 2500 pounds/sq. in and the stress-strain curve is stiffened greatly throughout its length.

*Example 3.*—Samples were prepared, as in Example 2, of a masticated rubber composition containing 57.2 parts by weight of high quality crude rubber, 25.0 parts carbon black, 5.5 parts zinc oxide, 2.2 parts sulphur, 0.7 part organic accelerator, 2.0 parts stearic acid, 5 parts age-resister, 2.0 parts pine tar, and 4.9 parts mineral rubber. One sample was given an optimum, uninterrupted cure of 45 minutes at 295° F., while three other samples were given a partial pre-cure for 20 minutes at 295° F. These three samples were stretched as before 0%, 100% and 400% and held in that condition while being further vulcanized for 25 minutes at 295° F.

As before, stress-strain data were obtained for these vulcanized samples and have been plotted in the graph of Fig. 3. Curve 8 represents the results obtained upon the control sample which was given the uninterrupted optimum cure, and curves 9, 10, and 11 respectively represent the results from the samples which were given a pre-cure of 20 minutes and then were stretched 0%, 100% and 400% during the final cure. The effect of the stretching during vulcanization is again clearly evident, the 400% elongation during cure (curve 11) for example having increased the modulus of the stock at 290% elongation from 1000 to 4000 pounds/sq. in. and reduced the percentage ultimate elongation of the same sample by about 275%. It is interesting to note that in this case, an elongation during cure of only 100% (curve 10) increased the modulus of the stock at 400% elongation by more than 1000 pounds/sq. in. and stiffened the stress-strain correspondingly throughout its length.

For convenience in conducting the tests described in Examples 2 and 3, it was necessary to interrupt the vulcanization of the rubber while it was being stretched. It is obvious however, that such procedure is not essential to the invention and that suitable means may be provided for stretching the rubber during the course of the vulcanization without interrupting the treatment. It should also be noted that it is not essential that the elongation be applied at one operation, and that it may be applied in increments, or continuously over a period of time in the course of the vulcanization.

The present invention is especially useful in manufacturing thread rubber because an elastic thread of high tensile strength and relatively low modulus or ultimate elongation is frequently desired and may be conveniently and economically produced by the herein described method. The unvulcanized thread which is to be stretched and vulcanized may be formed directly from latex in any convenient manner, or may be cut from a preformed sheet of latex rubber or of masticated rubber according to well known manufacturing methods.

The present process is also valuable in the manufacture of rubber thread of smaller gauge than is now commercially practicable, whether the thread be formed by cutting from rubber sheet or by extrusion of rubber compositions through an orifice, the two methods commonly employed. For example, a 50 gauge calendered rubber sheet is partially cured and cut into threads, measuring 50 x 50 gauge, in the usual manner. The ends of the several threads then are secured to a curing drum and the threads are stretched to about four times their original length, i. e., to about 300% elongation, and are wound upon the drum between layers of a suitable liner, in their stretched condition. The vulcanization then is completed. The finished threads measure approximately 100 x 100 gauge and exhibit the unique properties hereinabove discussed. It is also within the purview of this invention to employ unvulcanized rubber thread of very small gauge, whether made by cutting or extrusion. For example, a 70 gauge thread made by the extrusion of latex through an orifice, is dried, stretched to four times its normal length, and vulcanized while stretched, until an optimum soft rubber cure is effected. In this case the finished thread measures about 140 gauge and exhibits the unique properties hereinabove described.

The invention is by no means limited to the manufacture of rubber thread, however, but may be used with equal facility in the manufacture of numerous other rubber products. It is also to be understood that numerous changes and modifications may be made in the particular procedures herein described without departing from the spirit of the invention as defined in the appended claims.

In the claims, the normal rubber product to which the terms "superior", "sub-normal", "abnormal", etc. refer when used in connection with characteristic physical properties of the rubber is the product which would have resulted had the rubber of the product been vulcanized under substantially no tension.

I claim:

1. The method which comprises stretching vulcanizable rubber to an appreciable extent insufficient to rupture it, and vulcanizing the rubber, while it is held in its stretched condition, until it retains a substantial part of the applied elongation without losing its capability of being further extended at least 100%.

2. The method which comprises stretching vulcanizable rubber to an appreciable extent insufficient to rupture it, and vulcanizing the rubber while it is held in a stretched condition until a soft-vulcanized rubber is produced.

3. The method which comprises stretching an unvulcanized but vulcanizable rubber composition to an appreciable extent insufficient to rupture it, and vulcanizing the rubber composition, while it is held in a stretched condition, until it retains a substantial part of the applied elongation without losing its capability of being further extended at least 100%.

4. The method which comprises stretching vulcanizable rubber to at least 100% elongation, and vulcanizing the stretched rubber until a soft-vulcanized rubber is produced.

5. The method which comprises forming a deposit of vulcanizable latex rubber, placing the rubber under sufficient tension to effect at least 100% elongation thereof, and vulcanizing the rubber, while it is maintained under such tension, until it retains a substantial part of the applied elongation without losing its capability of being further extended at least 100%.

6. The method which comprises partially vulcanizing a vulcanizable rubber composition, appreciably stretching the partially vulcanized rubber, and continuing the vulcanization thereof while it is held in a stretched condition until it retains a substantial part of the applied elongation without losing its capability of being further extended at least 100%.

7. The method which comprises vulcanizing a vulcanizable rubber composition to an extent less than that required to produce an optimum soft rubber cure, appreciably stretching the partially vulcanized rubber, and continuing the vulcanization of the rubber while it is stretched until a soft-vulcanized rubber is produced.

8. The method of treating an unvulcanized but vulcanizable rubber composition during vulcanization which comprises initiating vulcanization of the rubber in an unstretched condition, in the course of the vulcanization stretching the rubber to an appreciable extent, maintaining it in a stretched condition, and continuing the vulcanization until the rubber retains a substantial part of the applied elongation without losing its capability of being further extended at least 100%.

9. The method which comprises partially vulcanizing rubber, stretching the partially vulcanized rubber to at least twice its unstretched length, and continuing the vulcanization of the rubber while it is held in a stretched condition until a soft-vulcanized rubber is produced.

10. The method which comprises preparing a rubber thread from a rubber composition containing a vulcanizing agent, stretching the thread to an appreciable extent, and continuing the vulcanization of the thread by application of heat thereto while it is held in a stretched condition until a soft-vulcanized rubber thread is produced.

11. The method of making rubber thread which comprises preparing a sheet of rubber composition containing a vulcanizing agent, partially vulcanizing the rubber sheet by application of heat thereto, cutting the partially vulcanized sheet into a plurality of threads, stretching the threads to an appreciable extent, and vulcanizing the threads while they are held in a stretched condition by heating the threads until soft-vulcanized rubber threads are produced.

12. The method which comprises preparing a rubber thread containing a vulcanizing agent but which has not been vulcanized to the extent required to produce an optimum soft rubber cure, stretching said thread to at least twice its unstretched length, and vulcanizing said thread while it is held in its stretched condition by heating the thread until a soft-vulcanized rubber thread is produced.

13. The method which comprises preparing a strip of unvulcanized but vulcanizable latex rubber, appreciably stretching the strip, and vulcanizing the stretched rubber strip until a soft-vulcanized rubber strip is produced.

14. A method as defined in claim 13 in which the unvulcanized strip is stretched to at least twice its unstretched length.

15. An elastic rubber product which has been vulcanized while under tension and which is characterized by a sub-normal ultimate elongation of not less than 100%.

16. A freely extensible and elastic soft-vulcanized rubber product which has been vulcanized while under appreciable tension and which is characterized by high tensile strength together with a sub-normal ultimate elongation and an abnormally stiff stress-strain relationship.

17. An elastic latex rubber product which has been vulcanized while under appreciable tension which is capable of being extended at least 100%, and which is characterized by superior resistance to abrasion.

18. Elastic soft-vulcanized rubber thread which has been vulcanized while under appreciable tension and which is characterized by a sub-normal ultimate elongation.

19. Soft-vulcanized latex rubber thread which has been vulcanized while under appreciable tension and which is characterized by a sub-normal ultimate elongation not less than 100% and superior resistance to abrasion.

20. A stretchable elastic soft-vulcanized rubber thread cut from a sheet of rubber and vulcanized while under appreciable tension, and which is characterized by a sub-normal ultimate elongation not less than 100%.

21. The method which comprises preparing an unvulcanized but vulcanizable rubber composition containing sulfur as a vulcanizing agent, stretching the rubber to a substantial extent insufficient to rupture it, and subjecting the stretched rubber to heat of such intensity and for such time as to cause the rubber to retain a substantial part of the applied elongation but not to become vulcanized beyond a soft-vulcanized rubber state.

22. The method which comprises forming an unmasticated latex rubber strip containing sulfur as a vulcanizing agent, stretching the rubber strip to a substantial extent insufficient to rupture it, and subjecting the stretched rubber strip to heat of such intensity and for such time as to cause the rubber to retain a substantial part of the applied elongation but not to become vulcanized beyond a soft-vulcanized rubber state.

JAMES W. SCHADE.